United States Patent
Seyffer et al.

(10) Patent No.: US 9,950,502 B2
(45) Date of Patent: *Apr. 24, 2018

(54) PAPER AND CARDBOARD PACKAGING WITH BARRIER COATING

(71) Applicant: BASF SE, Ludwigshafen (DE)

(72) Inventors: Hermann Seyffer, Heidelberg (DE); Carmen-Elena Cimpeanu, Ludwigshafen (DE); Heiko Diehl, Mannheim (DE); Darijo Mijolovic, Mannheim (DE); Andre Van Meer, Noordwolde (NL); Jan Van Delft, Wolvega (NL); Christof Van Sluijs, Leeuwarden (NL)

(73) Assignee: BASF SE, Ludwigshafen (DE)

( * ) Notice: Subject to any disclaimer, the term of this patent is extended or adjusted under 35 U.S.C. 154(b) by 848 days.

This patent is subject to a terminal disclaimer.

(21) Appl. No.: 14/360,803

(22) PCT Filed: Dec. 3, 2012

(86) PCT No.: PCT/EP2012/074189
§ 371 (c)(1),
(2) Date: May 27, 2014

(87) PCT Pub. No.: WO2013/083504
PCT Pub. Date: Jun. 13, 2013

(65) Prior Publication Data
US 2015/0274350 A1    Oct. 1, 2015

Related U.S. Application Data

(60) Provisional application No. 61/567,145, filed on Dec. 6, 2011.

(30) Foreign Application Priority Data

Dec. 6, 2011  (EP) ..................................... 11192104

(51) Int. Cl.
*B32B 27/10*  (2006.01)
*D21H 19/12*  (2006.01)
(Continued)

(52) U.S. Cl.
CPC ................ *B32B 27/10* (2013.01); *B32B 1/02* (2013.01); *B32B 27/30* (2013.01); *B32B 27/308* (2013.01); *B32B 29/00* (2013.01); *B32B 29/002* (2013.01); *B65D 5/00* (2013.01); *B65D 5/02* (2013.01); *B65D 5/18* (2013.01); *B65D 5/20* (2013.01); *B65D 5/36* (2013.01); *B65D 5/40* (2013.01); *B65D 5/42* (2013.01); *B65D 5/56* (2013.01); *B65D 5/563* (2013.01); *B65D 31/00* (2013.01); *B65D 65/42* (2013.01); *B65D 85/70* (2013.01); *C08F 2/22* (2013.01); *D21H 11/14* (2013.01); *D21H 19/12* (2013.01); *D21H 19/16* (2013.01); *D21H 19/20* (2013.01); *D21H 19/34* (2013.01); *D21H 19/52* (2013.01); *D21H 19/54* (2013.01); *D21H 19/58* (2013.01); *D21H 27/10* (2013.01); *B65D 2565/383* (2013.01);
(Continued)

(58) Field of Classification Search
CPC ... B65D 5/00; B65D 5/02; B65D 5/18; B65D 5/20; B65D 5/36; B65D 5/40; B65D 5/42; B65D 5/56; B65D 5/563; B32B 27/10; B32B 27/30; B32B 27/308; B32B 29/00; B32B 29/002; B32B 1/02; Y10T 428/1303; Y10T 428/1352; Y10T 428/1379; Y10T 428/1383; D21H 19/12
See application file for complete search history.

(56) References Cited

U.S. PATENT DOCUMENTS

| | | |
|---|---|---|
| 5,358,998 A | 10/1994 | Wendel et al. |
| 5,532,300 A | 7/1996 | Koubek et al. |
| 5,536,779 A | 7/1996 | Wendel et al. |
| 5,618,876 A | 4/1997 | Farwaha et al. |
| 5,925,722 A | 7/1999 | Exner et al. |
| 6,051,107 A | 4/2000 | Varnell |
| 6,080,813 A | 6/2000 | Wendel et al. |
| 6,245,838 B1 | 6/2001 | Bogaert et al. |
| 6,255,427 B1 | 7/2001 | Exner et al. |
| 6,310,132 B1 | 10/2001 | Sackmann et al. |

(Continued)

FOREIGN PATENT DOCUMENTS

| | | | |
|---|---|---|---|
| CN | 102817281 A | | 12/2012 |
| DE | 4445193 | * | 7/1995 |

(Continued)

OTHER PUBLICATIONS

U.S. Appl. No. 14/375,937, filed Jul. 31, 2014, Al-Hellani, et al.
(Continued)

*Primary Examiner* — Walter B Aughenbaugh
(74) *Attorney, Agent, or Firm* — Oblon, McClelland, Maier & Neustadt, L.L.P.

(57) ABSTRACT

Described is paper or cardboard packaging produced from mineral oil contaminated, (e.g., recycled) paper, wherein the packaging includes a barrier layer obtainable by applying an aqueous polymer dispersion comprising a copolymer obtainable by emulsion polymerization of $C_1$-$C_4$ alkyl (meth) acrylates, acid monomers, e.g., acrylic acid or methacrylic acid, 0-20 wt % of acrylonitrile and 0 to 10 wt % of further monomers in an aqueous medium in the presence of a carbohydrate compound, preferably in the form of a degraded starch, wherein the glass transition temperature of the copolymer is in the range from +10 to +45° C. The barrier layer may be situated on one of the surfaces of the packaging or form one of multiple layers of a multilayered packaging coating or be situated as a coating on one side of an inner bag situated within the packaging.

19 Claims, No Drawings

(51) Int. Cl.

| | |
|---|---|
| B65D 5/18 | (2006.01) |
| B65D 5/36 | (2006.01) |
| B65D 5/20 | (2006.01) |
| B65D 5/02 | (2006.01) |
| B65D 5/00 | (2006.01) |
| B65D 5/40 | (2006.01) |
| B65D 5/42 | (2006.01) |
| B32B 27/30 | (2006.01) |
| B65D 5/56 | (2006.01) |
| B32B 29/00 | (2006.01) |
| B32B 1/02 | (2006.01) |
| C08F 2/22 | (2006.01) |
| D21H 19/16 | (2006.01) |
| D21H 19/20 | (2006.01) |
| D21H 19/52 | (2006.01) |
| D21H 19/54 | (2006.01) |
| D21H 27/10 | (2006.01) |
| D21H 11/14 | (2006.01) |
| D21H 19/34 | (2006.01) |
| D21H 19/58 | (2006.01) |
| B65D 30/00 | (2006.01) |
| B65D 65/42 | (2006.01) |
| B65D 85/00 | (2006.01) |

(52) U.S. Cl.
CPC ..... B65D 2577/04 (2013.01); Y10T 428/1303 (2015.01); Y10T 428/1307 (2015.01); Y10T 428/1352 (2015.01); Y10T 428/1379 (2015.01); Y10T 428/1383 (2015.01); Y10T 428/264 (2015.01); Y10T 428/31906 (2015.04)

(56) References Cited

U.S. PATENT DOCUMENTS

| | | | |
|---|---|---|---|
| 6,489,396 B2* | 12/2002 | Nakamura | C08F 220/18 525/107 |
| 6,706,145 B2 | 3/2004 | Werres et al. | |
| 6,800,675 B1 | 10/2004 | Pfalz et al. | |
| 6,830,657 B1 | 12/2004 | Betremieux et al. | |
| 6,841,595 B2 | 1/2005 | Brizzolara et al. | |
| 7,311,955 B1* | 12/2007 | Hoffman | B32B 29/00 220/62.2 |
| 7,320,825 B2 | 1/2008 | Morabito | |
| 7,452,592 B2 | 11/2008 | Cowton | |
| 7,666,963 B2 | 2/2010 | Rodrigues et al. | |
| 7,829,611 B2 | 11/2010 | Kelly | |
| 7,972,526 B2 | 7/2011 | Murphy et al. | |
| 8,058,374 B2 | 11/2011 | Rodrigues et al. | |
| 8,227,381 B2 | 7/2012 | Rodrigues et al. | |
| 8,273,435 B2 | 9/2012 | Murphy et al. | |
| 8,299,153 B2 | 10/2012 | Kelly | |
| 8,546,472 B2 | 10/2013 | Loos et al. | |
| 8,604,101 B2 | 12/2013 | Ren et al. | |
| 8,637,160 B2 | 1/2014 | Schmidt-Thuemmes et al. | |
| 8,771,812 B2* | 7/2014 | Seyffer | D21H 27/10 428/34.1 |
| 9,109,068 B2 | 8/2015 | Rodrigues et al. | |
| 9,321,873 B2 | 4/2016 | Thomaldes et al. | |
| 2003/0022976 A1 | 1/2003 | Brizzolara et al. | |
| 2003/0155071 A1 | 8/2003 | Werres et al. | |
| 2004/0115424 A1 | 6/2004 | Cowton | |
| 2004/0241475 A1 | 12/2004 | Morabito | |
| 2006/0122318 A1 | 6/2006 | Jho et al. | |
| 2006/0264539 A1 | 11/2006 | Mosseveld | |
| 2008/0020961 A1 | 1/2008 | Rodrigues et al. | |
| 2008/0021168 A1 | 1/2008 | Rodrigues et al. | |
| 2008/0152817 A1 | 1/2008 | Kelly | |
| 2008/0051539 A1 | 2/2008 | Kelly | |
| 2009/0148608 A1 | 6/2009 | Nadeau et al. | |
| 2010/0159263 A1 | 6/2010 | Ahlgren et al. | |
| 2010/0303981 A1 | 12/2010 | Murphy et al. | |
| 2010/0304071 A1 | 12/2010 | Murphy et al. | |
| 2010/0304116 A1 | 12/2010 | Murphy et al. | |
| 2011/0008619 A1 | 1/2011 | Murphy et al. | |
| 2011/0028371 A1 | 2/2011 | Rodrigues et al. | |
| 2011/0046025 A1 | 2/2011 | Rodrgues et al. | |
| 2011/0136718 A1 | 6/2011 | Rodrigues et al. | |
| 2011/0189487 A1 | 8/2011 | Zacharias et al. | |
| 2011/0281130 A1 | 11/2011 | Evstatieva et al. | |
| 2012/0048463 A1 | 3/2012 | Cimpeanu et al. | |
| 2012/0058332 A1 | 3/2012 | Müller et al. | |
| 2012/0077044 A1 | 3/2012 | Beyers et al. | |
| 2012/0135169 A1 | 5/2012 | Tangelder et al. | |
| 2012/0244350 A1 | 9/2012 | Cimpeanu et al. | |
| 2012/0301641 A1 | 11/2012 | Zhou et al. | |
| 2012/0302489 A1 | 11/2012 | Rodrigues et al. | |
| 2012/0308749 A1 | 12/2012 | Seyffer et al. | |
| 2013/0005870 A1 | 1/2013 | Kelly et al. | |
| 2013/0040158 A1 | 2/2013 | Marakainen et al. | |
| 2013/0096239 A1 | 4/2013 | Biltresse et al. | |
| 2013/0101865 A1 | 4/2013 | Ren et al. | |
| 2013/0137799 A1 | 5/2013 | Rodrigues et al. | |
| 2014/0038485 A1 | 2/2014 | Anderson et al. | |
| 2015/0152244 A1 | 6/2015 | Hernandez-Torres | |

FOREIGN PATENT DOCUMENTS

| | | |
|---|---|---|
| EP | 0 536 597 A1 | 4/1993 |
| JP | 2005-29940 A | 2/2005 |
| JP | 2006-28697 A | 2/2006 |
| JP | 2011-195809 A | 10/2011 |
| JP | 2011-219633 A | 11/2011 |
| WO | WO 02/40579 A1 | 5/2002 |
| WO | WO 03/006511 A2 | 1/2003 |
| WO | WO 2006/053849 A1 | 5/2006 |
| WO | WO 2010/094641 A1 | 8/2010 |
| WO | WO 2011/069950 A1 | 6/2011 |
| WO | WO 2011/095444 A1 | 8/2011 |
| WO | WO 2011/117308 A1 | 9/2011 |
| WO | WO 2011/157679 A1 | 12/2011 |
| WO | WO 2012/013506 A1 | 2/2012 |
| WO | WO 2012/028520 A1 | 3/2012 |
| WO | WO 2012/028530 A1 | 3/2012 |
| WO | WO 2012/126921 A1 | 9/2012 |
| WO | WO 2012/163749 A2 | 12/2012 |
| WO | WO 2012/163821 A1 | 12/2012 |
| WO | WO 2013/041649 A1 | 3/2013 |
| WO | WO 2013/053840 A2 | 4/2013 |
| WO | WO 2013/068375 A1 | 5/2013 |
| WO | WO 2013/120790 A1 | 8/2013 |
| WO | WO 2013/186720 A2 | 12/2013 |
| WO | WO 2014/005879 A1 | 1/2014 |
| WO | WO 2014/040427 A1 | 3/2014 |

OTHER PUBLICATIONS

U.S. Appl. No. 14/350,467, filed Apr. 8, 2014, Cimpeanu, et al.
U.S. Appl. No. 14/356,530, filed May 6, 2014, Seyffer, et al.
International Search Report dated Mar. 11, 2013 in PCT/EP2012/074189.
U.S. Appl. No. 14/410,214, filed Dec. 22, 2014, Van Sluijs, et al.

* cited by examiner

PAPER AND CARDBOARD PACKAGING WITH BARRIER COATING

The present invention relates to paper or cardboard packaging produced from mineral oil contaminated, (e.g., recycled) paper with a barrier layer obtainable by applying an aqueous polymer dispersion comprising a copolymer obtainable by emulsion polymerization of C1-C4 alkyl (meth)acrylates, acid monomers and optionally further monomers in the presence of a carbohydrate compound, wherein the glass transition temperature of the copolymer is in the range from +10 to +45° C. The barrier layer may be situated on one of the surfaces of the packaging, or form one of multiple layers of a multilayered packaging coating or be situated as a coating on one side of an inner bag situated within the packaging. The invention also relates to the use of the polymer dispersion for producing a barrier layer against volatile, hydrophobic organic substances.

Paperboard packaging is generally produced from recycled paper. In the case of printed paper, especially newspaper, the recycled paper may comprise mineral oil residues from the printing inks typically used to print newspapers. Even at room temperature, volatiles evaporate from these residues and, in the case of food packaging, deposit on the food items packed in the box, for example pasta, semolina, rice or cornflakes. Even most of the inner bags currently used, which are made of polymer film, do not offer adequate protection. Studies carried out by Zurich Cantonal Laboratory detected an appreciable level of mineral oil residues in food items which were packed in packaging produced from recycled paper. The volatile mineral oil constituents are predominantly paraffinic and naphthenic hydrocarbons, known to be a health concern, and aromatic hydrocarbons, especially those of 15-25 carbon atoms.

There is accordingly a need to reduce the risk of food items becoming contaminated with mineral oil residues or other volatile organic compounds which can impair the quality of packaged products. This group includes for example the currently debated environmental poisons and noxiants from dyes, plasticizers, photoinitiators and other sources, which can end up in packaging via the paper recycling process for example: e.g., isopropylthioxanthan (ITX), benzophenone, 4-methylbenzophenone, esters of phthalic acid, fatty acid esters, fatty acid amides (erucamide for example). One possibility would be to dispense with recycling of newspaper in the production of paperboard for the packaging of food. This is undesirable for ecological reasons and impracticable on account of insufficient availability of virgin cellulose. Another solution would be to dispense with mineral oils in the printing inks for newsprint. But this comes up against technological obstacles, particularly with regard to the wipe-off resistance of the print on the paper surface. Grease and oil repellent barrier coatings are known in the packaging sector. WO 2006/053849 for example describes coatings based on waterborne polymeric compositions for paper and board. The polymers do show good barrier properties against liquid greasy substances, but it has transpired that this does not necessarily also provide a good barrier effect against substances permeating in gaseous form, since the transport mechanisms for the permeating substances are different. In the case of liquid oils and greases, transportation takes place via the fibers, for which capillary forces and surface wetting play a part. In the case of problems with substances transferring in gaseous form, it is not capillarity and wetting which are important but sorption, diffusion and porosity.

There is further also a need for coatings with barrier performance in relation to other, non-critical, but migrating, hydrophobic substances, for example aromas.

The European patent applications with the publication numbers EP11168090.6 and EP11168097.1 (U.S. application Nos. 61/491,248 and 61/491,250) describe paper and cardboard packaging with barrier coatings. The polymer dispersions described therein do provide a good barrier to volatile mineral oil constituents. However, there are certain application techniques, where the coating composition is exposed to high shear, where the coating composition becomes unstable, which has a disruptive effect in many coating applications. The coating process can lead for instance to coagulum formation on rotating rolls and rollers, to coagulum formation on a scraper or blade or to coagulum formation in pumping operations or to tatters forming on rolls in printing processes (e.g., flexographic printing and others).

It is an object of the present invention to provide packaging which despite use of mineral oil contaminated, recycled paper reduces the risk of packaged contents becoming contaminated with volatile mineral oil constituents, or which generally offers protection against packaged products becoming impaired by volatile organic compounds passing through the packaging, or which is endowed with an aroma barrier and which can also be reliably produced using a very shear-stable coating composition.

This object is achieved according to the present invention by paper or cardboard packaging produced at least partly from mineral oil contaminated (e.g., recycled) paper, wherein the packaging includes at least one barrier layer obtainable by applying an aqueous polymer dispersion comprising at least one copolymer obtainable by emulsion polymerization of (a) one or more principal monomers selected from the group consisting of $C_1$-$C_4$ alkyl (meth)acrylates,
(b) 0.1 to 5 wt % of one or more acid monomers, e.g., selected from acrylic acid and methacrylic acid,
(c) 0-20 wt % of acrylonitrile and
(d) 0 to 10 wt % of further monomers other than the monomers (a) to (c), wherein the glass transition temperature of the copolymer is in the range from +10 to +45° C., wherein the emulsion polymerization is carried out in an aqueous medium in the presence of at least one carbohydrate compound, wherein the barrier layer may be situated on one or more of the surfaces of the packaging, or the barrier layer may form at least one of multiple layers of a multilayered packaging coating or the barrier layer may be situated as a coating on at least one side of an inner bag situated within the packaging. The packaging is useful for food in particular.

It surprisingly transpires that the use of carbohydrate compounds, especially the use of degraded polysaccharides, i.e., of short-chain carbohydrates (e.g., maltodextrins, glucose syrup) in the polymerization leads to a distinct improvement in the shear stability of the polymer dispersions obtained and, contrary to expectations, has no adverse effect on barrier performance.

Mineral oil contaminated is to be understood as meaning that the paper comprises amounts of volatile hydrocarbons, especially volatile paraffins, volatile naphthenes and/or volatile aromatic hydrocarbons having up to 25 carbon atoms, that are detectable by customary methods of analysis. Volatile hydrocarbons are hydrocarbons having up to 25 carbon atoms, for example from 5 to 22 carbon atoms. In one embodiment of the invention, the mineral oil contamination comes from printing inks and comprises volatile paraffins, volatile naphthenes and/or volatile aromatic hydrocarbons.

Volatile, hydrophobic organic compounds have a solubility of less than 1 wt % and preferably less than 0.1 wt % in water at 20° C. and a molecular weight of less than 500 and preferably less than 350.

In what follows, the designation "(meth)acryl . . . " and similar designations are used as an abbreviating notation for "acryl . . . or methacryl . . . ".

The polymer dispersions to be used according to the invention are dispersions of polymers in an aqueous medium. An aqueous medium may be for example completely ion-free water or else a mixture of water with a miscible solvent such as methanol, ethanol, or tetrahydrofuran. Preferably, no organic solvents are used. The solids contents of the dispersions are preferably in the range from 15 to 75 wt %, more preferably in the range from 40 to 60 wt % and more particularly above 50 wt %. The solids content can be set for example through appropriate adjustment of the water quantity used in the emulsion polymerization and/or of the monomer quantities. The median size of the polymer particles dispersed in the aqueous dispersion is preferably below 400 nm and more particularly below 300 nm. The median particle size is more preferably between 70 and 250 nm or between 80 and 150 nm. Median particle size here refers to the $d_{50}$ value of the particle size distribution, i.e., 50 wt % of the total mass of all particles have a particle diameter smaller than the $d_{50}$ value. The particle size distribution can be determined in a known manner using an analytical ultracentrifuge (W. Mächtle, Makromolekulare Chemie 185 (1984), pages 1025-1039). The pH of the polymer dispersion can be set to above pH 4 especially to a pH between 5 and 9.

The copolymers to be used according to the present invention are emulsion polymers obtainable by emulsion polymerization of free-radically polymerizable monomers. The copolymer is formed from one or more principal monomers (a), which are selected from the group consisting of $C_1$-$C_4$ alkyl (meth)acrylates. The principal monomers (a) are preferably used at not less than 70 wt % and more preferably at not less than 75 wt %, for example from 79.5 to 99.5 100 wt %, based on the sum total of all monomers. Particularly preferred principal monomers (a) are selected from the group consisting of methyl acrylate, methyl methacrylate, ethyl acrylate and n-butyl acrylate.

The copolymer is formed from one or more acid monomers (b). Acid monomers are ethylenically unsaturated free-radically polymerizable monomers with at least one acid group, for example monomers with carboxylic acid, sulfonic acid or phosphonic acid groups. Carboxylic acid groups are preferred. Acrylic acid, methacrylic acid, itaconic acid, maleic acid or fumaric acid is suitable for example. The acid monomers (b) are preferably selected from acrylic acid and methacrylic acid. The acid monomers (b) are used at 0.1 to 5 wt % and preferably at 0.5 to 5 wt %, based on the sum total of all monomers.

The copolymer may optionally be formed of acrylonitrile as further monomer (c) at 0 to 20 wt %, based on the sum total of all monomers. In one embodiment of the invention, the copolymer is formed from acrylonitrile at 1-20 wt % and preferably 2-20 wt %.

The copolymer can optionally be formed of further monomers (d) other than the monomers (a) to (c). The amount of further monomers (d) is 0 to 10 wt % or 0 to 5 wt %, based on the sum total of all monomers. One embodiment utilizes from 0.1 to 10 wt % or 0.1 to 5 wt % of further monomers (d). Another embodiment utilizes no further monomers other than the monomers (a) to (c).

The further monomers (d) may be selected from the group consisting of $C_5$-$C_{20}$ alkyl (meth)acrylates, vinyl esters of carboxylic acids comprising up to 20 carbon atoms, vinylaromatics having up to 20 carbon atoms, ethylenically unsaturated nitriles other than acrylonitrile, vinyl halides, vinyl ethers of alcohols comprising 1 to 10 carbon atoms, aliphatic hydrocarbons having 2 to 8 carbon atoms and one or two double bonds, or mixtures thereof. $C_5$-$C_{10}$ Alkyl (meth)acrylates, such as 2-ethylhexyl acrylate, are suitable for example. Mixtures of alkyl (meth)acrylates are also suitable in particular. Vinyl esters of carboxylic acids having 1 to 20 carbon atoms are for example vinyl laurate, vinyl stearate, vinyl propionate, vinyl versatate and vinyl acetate. Useful vinylaromatic compounds include vinyltoluene, a-methylstyrene, p-methylstyrene, alpha-butylstyrene, 4-n-butylstyrene, 4-n-decylstyrene and preferably styrene. Methacrylonitrile is an example of nitriles. Vinyl halides are chlorine-, fluorine- or bromine-substituted ethylenically unsaturated compounds, preferably vinyl chloride and vinylidene chloride. Vinyl methyl ether and vinyl isobutyl ether are examples of suitable vinyl ethers. Preference is given to vinyl ethers of alcohols comprising 1 to 4 carbon atoms. As hydrocarbons having 4 to 8 carbon atoms and two olefinic double bonds there may be mentioned butadiene, isoprene and chloroprene. $C_5$ to $C_{10}$ alkyl acrylates and methacrylates and vinylaromatics, especially styrene and mixtures thereof are preferred as further monomers (d). n-Hexyl acrylate, octyl acrylate and 2-ethylhexyl acrylate, 2-propylheptyl acrylate, styrene and also mixtures thereof are very particularly preferred. Further monomers (d) also include for example hydroxyl-containing monomers, especially $C_1$-$C_{10}$ hydroxyalkyl (meth)acrylates and also (meth) acrylamide. Useful further monomers (d) further include phenyloxyethyl glycol mono(meth)acrylate, glycidyl acrylate, glycidyl methacrylate, amino (meth)acrylates such as 2-aminoethyl (meth)acrylate. Crosslinking monomers may also be mentioned as further monomers (d).

In one embodiment of the invention, the copolymer is obtainable from
(a) 79.5 to 99.5 wt % of one or more principal monomers selected from the group consisting of $C_1$-$C_4$ alkyl (meth) acrylates,
(b) 0.5 to 5 wt % of one or more acid monomers selected from acrylic acid and methacrylic acid,
(c) 0-20 wt % of acrylonitrile, and
no further monomers other than the monomers (a) to (c).

The monomers of the copolymer are adapted in terms of type and amounts such that the glass transition temperature of the emulsion polymer is in the range from +10 to +45° C., preferably from +15 to +40° C. The glass transition temperature can be determined by differential scanning calorimetry (ASTM D 3418-08 "midpoint temperature").

The emulsion polymerization is carried out in the presence of at least one carbohydrate compound. The carbohydrate compound may be selected from oligosaccharides (constructed of 2 to 10 saccharide units) and polysaccharides (constructed of more than 10 saccharide units), especially from degraded polysaccharides, preferably degraded starch, degraded hemicelluloses or degraded chitosan. Maltodextrin and glucose syrup are particularly preferred. The emulsion polymerization utilizes preferably from 10 to 200 parts by weight and more preferably from 20 to 150 parts by weight or from 30 to 150 parts by weight of carbohydrate compound per 100 parts by weight of monomer to be polymerized.

Useful starting starches for preparing the degraded starches to be used according to the present invention include all native starches such as starches from maize (corn), wheat, oats, barley, rice, millet, potato, peas, tapioca, sorghum or sago. Also of interest are those natural starches which have a high amylopectin content such as wax maize starch and wax potato starch. The amylopectin content of these starches is above 90%, usually in the range from 95 to 100%. Starches modified chemically by etherification or esterification can also be used for preparing the polymer dispersions of the present invention. Such products are known and commercially available. They are prepared for example by esterification of native starch or degraded native starch with inorganic or organic acids, their anhydrides or chlorides. Of particular interest are phosphated and acetylated degraded starches. The most common method to etherify starches consists in treating starch with organic halogen compounds, epoxides or sulfates in aqueous alkaline solution. Known starch ethers are alkyl ethers, hydroxyalkyl ethers, carboxyalkyl ethers and allyl ethers. The reaction products of starches with 2,3-epoxypropyltrimethylammonium chloride are also useful. Particular preference is given to degraded native starches, more particularly native starches degraded to maltodextrin or to glucose syrup. Further suitable starches include cationically modified starches, i.e., starch compounds having amino groups or ammonium groups. Degradation of the starches can be effected enzymatically, oxidatively or hydrolytically through action of acids or bases. Degraded starches are commercially available. However, it is also possible for a natural starch to be firstly degraded, for example enzymatically, in an aqueous medium and, after the enzymatic degradation has been stopped, for the emulsion polymerization of the monomers to be carried out according to the present invention in the resulting aqueous solution or dispersion of the degraded starch. The carbohydrate compounds, more particularly the degraded starches, have for example an intrinsic viscosity $\eta i$ of less than 0.07 dl/g or less than 0.05 dl/g. The intrinsic viscosity $\eta i$ is preferably in the range from 0.02 to 0.06 dl/g. The intrinsic viscosity $\eta i$ is determined in accordance with DIN EN1628 at a temperature of 23° C.

The DE value is an alternative way to characterize the degree of degradation of polysaccharides, more particularly of starches which is very common in the field. DE denotes Dextrose Equivalent and refers to the percentage fraction of reducing sugar in the dry substance. It corresponds to the amount of glucose (=dextrose) which would have the same reducing power per 100 g of dry substance. The DE value is a measure of how far polymer degradation has proceeded; hence products obtained having a low DE value retain a high proportion of polysaccharides and a low content of low molecular weight sugars, while products of high DE value are mainly made up of just low molecular weight sugars only. Examples of suitable degraded starches are maltodextrin and glucose syrup. Preferred maltodextrins have intrinsic viscosities in the range of not less than about 0.04 to 0.06 dl/g, DE values of 3 to 20 and molar masses $M_w$ in the range from 15 000 to 20 000 g/mol. Preferred glucose syrup has intrinsic viscosities in the range from 0.02 to 0.04 dl/g, DE values in the range from 20 to 30 and molar masses $M_w$ in the range from 3000 to 6000 g/mol. Owing to their method of making, these products are obtained in the form of aqueous solutions and they are also commercialized as such. Suitable solutions of maltodextrins have solids contents of 50 to 70%, while suitable solutions of glucose syrup have solids contents of 70 to 95%. Especially maltodextrins, however, are also available in spray-dried form as a powder.

Copolymers may be obtained by emulsion polymerization, in which case an emulsion polymer is concerned. An emulsion polymerization generally utilizes ionic and/or nonionic emulsifiers and/or protective colloids/stabilizers as surface-active compounds to augment monomer dispersion in the aqueous medium. Protective colloids are polymeric compounds which on solvation bind large amounts of water and are capable of stabilizing dispersions of water-insoluble polymers. Unlike emulsifiers, they generally do not lower the surface tension between polymer particles and water. A detailed description of suitable protective colloids is found in Houben-Weyl, Methoden der organischen Chemie, volume XIV/1, Makromolekulare Stoffe, Georg-Thieme-Verlag, Stuttgart, 1961, pages 411 to 420. Useful protective colloids include for example amphiphilic polymers, i.e., polymers having hydrophobic and hydrophilic groups. Natural polymers, such as starch, or synthetic polymers may be concerned. Useful emulsifiers include both anionic and nonionic surface-active substances the number average molecular weight of which is typically below 2000 g/mol or preferably below 1500 g/mol, while the number average molecular weight of protective colloids is above 2000 g/mol, for example in the range from 2000 to 100 000 g/mol and more particularly in the range from 5000 to 50 000 g/mol. Anionic and nonionic emulsifiers are preferably used as surface-active substances. Suitable emulsifiers are for example ethoxylated $C_8$-$C_{36}$ fatty alcohols having a degree of ethoxylation in the range from 3 to 50, ethoxylated mono-, di- and tri-$C_4$-$C_{12}$-alkylphenols having a degree of ethoxylation in the range from 3 to 50, alkali metal salts of dialkyl esters of sulfosuccinic acid, alkali metal and ammonium salts of $C_8$-$C_{12}$ alkyl sulfates, alkali metal and ammonium salts of $C_{12}$-$C_{18}$ alkylsulfonic acids and alkali metal and ammonium salts of $C_9$-$C_{18}$ alkylarylsulfonic acids. When emulsifiers and/or protective colloids are (co)used as auxiliaries for dispersing the monomers, the amounts used thereof are for example in the range from 0.1 to 5 wt %, based on the monomers. Trade names of emulsifiers are for example Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Lumiten® ISC, Disponil® NLS, Disponil LDBS 20, Disponil FES 77, Lutensol AT 18, Steinapol VSL, Emulphor NPS 25. The surface-active substance is typically used in amounts of 0.1 to 10 wt %, based on the monomers to be polymerized.

The emulsion polymerization temperature is generally in the range from 30 to 130° C. and preferably in the range from 50 to 90° C. The polymerization may also be carried out under pressure, for example at pressure up to 15 bar, for example at 2 to 10 bar. The polymerization medium may consist of water only but also of mixtures of water with miscible liquids such as methanol. It is preferable to use just water. The emulsion polymerization may be carried out not only as a batch operation but also in the form of a feed stream addition process, including staged or gradient mode. Preference is given to the feed stream addition process wherein a portion of the polymerization batch is initially charged, heated to the polymerization temperature, incipiently polymerized and subsequently admixed with the rest of the polymerization batch continuously or else stagewise, typically via two or more spatially separated feed streams of which one or more comprise the monomers in pure or emulsified form.

The emulsion polymerization process may utilize the customary known assistants, for example water-soluble initiators and chain transfer agents. Water-soluble initiators for an emulsion polymerization are for example ammonium or alkali metal salts of peroxydisulfuric acid, e.g. sodium peroxodisulfate, hydrogen peroxide or organic peroxides, for example tert-butyl hydroperoxide. Redox (reduction-oxidation) initiator systems are also suitable. Redox initiator systems consist of one or more than one usually inorganic reducing agent and one or more than one organic or inorganic oxidizing agent. The oxidizing component comprises for example the abovementioned initiators for an emulsion polymerization. The reducing components are for example alkali metal salts of sulfurous acid, e.g., sodium sulfite, sodium hydrogensulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems may be used together with soluble metal compounds where the metallic component can exist in two or more valency states. Customary redox initiator systems are for example ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, can also be mixtures, for example a mixture of the sodium salt of hydroxymethanesulfinic acid and sodium disulfite. The compounds mentioned are usually used in the form of aqueous solutions, the lower concentration being determined by the water quantity tolerable in the dispersion and the upper concentration by the solubility in water of the compound in question. In general, the concentration is in the range from 0.1 to 30 wt %, preferably 0.5 to 20 wt % and more preferably 1.0 to 10 wt %, based on the solution. The amount of initiators is generally in the range from 0.1 to 10 wt % and preferably in the range from 0.5 to 5 wt %, based on the monomers to be polymerized. Two or more different initiators can also be used in an emulsion polymerization. To remove the residual monomers, the initiator is typically also added after the actual emulsion polymerization has ended.

In one embodiment of the process according to the present invention, at least 15 wt % of the initiator is initially charged in the aqueous medium together with at least some of the carbohydrate compound and optionally a seed latex, and the monomers and the rest of the initiator are metered into this initial charge under polymerization conditions. It is also possible for from 1 to 10 wt % of total monomer to be polymerized to be included in the initial charge in addition to the initiator and the optional seed latex. The rest of the monomer, the rest of the initiator and any carbohydrate compounds are then metered into the initial charge after the polymerization has started, under polymerization conditions, although monomer and initiator are preferably added separately from each other. Under polymerization conditions is to be understood as meaning that the reaction mixture in the initial charge has been heated to the requisite temperature at which the polymerization proceeds.

The polymerization is carried out in the presence of carbohydrate compounds, which can be initially charged or added to the polymerization vessel together with monomer. Optionally, additional fractions of carbohydrate compounds can be added after the polymerization.

Chain transfer agents may be used in the polymerization, for example in amounts of 0 to 0.8 part by weight, based on 100 parts by weight of the monomers to be polymerized, which reduces the molar mass. Suitable chain transfer agents include for example compounds having a thiol group such as tert-butyl mercaptan, mercaptoethyl propionate, 2-ethylhexyl thioglycolate, ethyl thioglycolate, mercaptoethanol, mercaptopropyltrimethoxysilane, n-dodecyl mercaptan, or tert-dodecyl mercaptan. It is further possible to use chain transfer agents without thiol group, for example terpinolene. In one preferred embodiment, the emulsion polymer has been prepared using from 0.05 to 0.5 wt %, based on the monomer quantity, of at least one chain transfer agent.

The polymer dispersion used for coating the packaging may consist solely of the emulsion polymer dispersed in water for the use according to the invention. However, the polymer dispersion in question may also comprise further added substances, for example fillers, antiblocking agents, dyes, flow control agents, pigments, binders or thickeners.

The polymer dispersion can also be part of paper coating compositions, and/or be combined with pigments and binders customarily used in paper coating slips, provided the barrier effect is not excessively compromised as a result. Paper coating compositions, in addition to water, generally comprise pigments, binders and auxiliaries for setting the requisite rheological properties, for example thickeners. The pigments are typically in a state of dispersion in water. The paper coating composition typically comprises pigments in an amount of preferably at least 80 wt %, for example 80 to 95 wt % or 80 to 90 wt %, based on total solids content. White pigments are contemplated in particular. Suitable pigments include, for example, metal salt pigments such as, for example, calcium sulfate, calcium aluminate sulfate, barium sulfate, magnesium carbonate and calcium carbonate, of which carbonate pigments, more particularly calcium carbonate are preferred. The calcium carbonate may be natural ground calcium carbonate (GCC), precipitated calcium carbonate (PCC), lime or chalk. Suitable calcium carbonate pigments are available for example as Covercarb® 60, Hydrocarb® 60 or Hydrocarb® 90 ME. Further suitable pigments include, for example, silicas, aluminas, aluminum hydrate, silicates, titanium dioxide, zinc oxide, kaolin, argillaceous earths, talc or silicon dioxide. Suitable further pigments are available for example as Capim® MP 50 (Clay), Hydragloss® 90 (Clay) or Talcum 010.

In one embodiment of the invention, the at least one copolymer is used in combination with for example up to 1 part by weight of pigments, preferably platelet-shaped pigments, based on 1 part by weight of copolymer. Examples of platelet-shaped pigments are talc, clay or mica (glimmer). Talc is preferred. Preferred aspect ratios (ratio of length to thickness) are above 10.

The polymer dispersion to be used according to the present invention can be used in combination with further, different polymeric binders provided the barrier effect is not excessively compromised as a result. Preferably, further binders are used in amounts of not more than 20 parts by weight, not more than 10 parts by weight, not more than 5 parts by weight, all based on 100 parts by weight of carbohydrate compound, or not at all. The most important functions of binders in paper coating compositions are to bind the pigments to the paper and the pigments to each other and to some extent fill voids between pigment particles. For every 100 parts by weight of pigments, the amount of organic binder used (in terms of binder solids, i.e. without water or other solvent liquid at 21° C., 1 bar) is for example in the range from 1 to 50 parts by weight, preferably in the range from 1 to 25 parts by weight or in the range from 5 to 20 parts by weight. Useful further binders include natural-based binders, more particularly binders based on starch, and also synthetic binders, more particularly emulsion polymers obtainable by emulsion polymerization. A binder based on starch is in this context to be understood as referring to any native, modified or degraded starch added after polymerization. Native starches can consist of amylose, amylopectin or mixtures thereof. Modified starches may comprise oxidized starch, starch esters or starch ethers. Hydrolysis can be used to reduce the molecular weight of the starch (degraded starch). Possible degradation products include oligosaccharides or dextrins. Preferred starches are cereal starch, maize starch and potato starch. Particular preference is given to cereal starch and maize starch and very particular preference is given to cereal starch.

The further synthetic binders other than the polymers to be used according to the present invention preferably consist of so-called principal monomers to an extent of at least 40% by weight, preferably to an extent of at least 60% by weight and more preferably to an extent of at least 80% by weight. The principal monomers are selected from C1-C20 alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, or mixtures thereof. Examples include alkyl (meth)acrylates having a C1-C10 alkyl moiety, such as methyl methacrylate, methyl acrylate, n-butyl acrylate, ethyl acrylate and 2-ethylhexyl acrylate. Mixtures of alkyl (meth)acrylates are also suitable in particular. Vinyl esters of carboxylic acids having 1 to 20 carbon atoms include, for example, vinyl laurate, vinyl stearate, vinyl propionate, vinyl versatate and vinyl acetate. Useful vinylaromatic compounds include vinyltoluene, α-methylstyrene, p-methylstyrene, α-butylstyrene, 4-n-butylstyrene, 4-n-decylstyrene and preferably styrene. Examples of nitriles are acrylonitrile and methacrylonitrile. Vinyl halides are chlorine-, fluorine- or bromine-substituted ethylenically unsaturated compounds, preferably vinyl chloride and vinylidene chloride. Specific examples of vinyl ethers are vinyl methyl ether and vinyl isobutyl ether. Preference is given to vinyl ethers of alcohols comprising 1 to 4 carbon atoms. Specific examples of hydrocarbons having 2 to 8 carbon atoms and one or two olefinic double bonds are ethylene, propylene, butadiene, isoprene and chloroprene.

Preferred principal monomers are C1-C10 alkyl (meth) acrylates and mixtures thereof with vinylaromatics, more particularly styrene, or hydrocarbons having 2 double bonds, more particularly butadiene, or mixtures of such hydrocarbons with vinylaromatics, more particularly styrene. In the case of mixtures of aliphatic hydrocarbons (more particularly butadiene) with vinylaromatics (more particularly styrene) the ratio can be for example between 10:90 to 90:10, more particularly 20:80 to 80:20. Particularly preferred principal monomers are butadiene and the above mixtures of butadiene and styrene. In addition to the principal monomers, the emulsion polymer useful as a binder may comprise further monomers, for example monomers having carboxylic acid, sulfonic acid or phosphonic acid groups. Preference is given to carboxylic acid groups. Specific examples are acrylic acid, methacrylic acid, itaconic acid, maleic acid and fumaric acid. The level of ethylenically unsaturated acids in the emulsion polymer is generally below 10% by weight, preferably below 8% by weight and at least 0.1% by weight or at least 1% by weight. Further monomers include, for example, hydroxyl-containing monomers, more particularly C1-C10 hydroxyalkyl (meth)acrylates, or amides such as (meth)acrylamide.

The coating of polymer dispersion on the substrate acts as a barrier layer. A particularly effective barrier layer is obtained by using a copolymer whereby a coating with the copolymer has a permeability to gaseous n-hexane of less than 80 g/m$^2$ d, preferably of less than 50 g/m$^2$ d, and more preferably less than 10 g/m$^2$ d, even more preferably less than 5 g/m$^2$ d or less than 1 g/m$^2$ at 23° C. and a coat weight of 5 to 30 g/m$^2$ on paper (see method of measurement in the examples described hereinbelow).

The level of the at least one copolymer in the dispersion used for coating is preferably at least 1 wt % and more particularly at least 5 wt % and up to 60 or up to 75 wt %. Preferably, the level of the at least one copolymer in aqueous dispersion is in the range from 15 to 75 wt %, or in the range from 40 to 60 wt %. Preferred aqueous dispersions of the copolymers have a viscosity of 10 to 150 000 mPas, or 50 to 5000 mPas (measured with a Brookfield viscometer at 20° C., 100 rpm, spindle 4) at pH 4 and 20° C. The median size of the particles of copolymer which are dispersed in the aqueous dispersion is for example from 0.02 to 100 µm, and preferably 0.05 to 10 µm. It can be determined using for example optical microscopy, light scattering or freeze fracture electron microscopy.

The weight ratio of pigment to barrier polymer is preferably in the range from 0:100 to 75:25. When still other solid components are present in the overall system, the weight ratio of the sum total of all solid components to barrier polymer is preferably not more than 90:10 or 80:20.

According to the invention, the carrier substrates are coated with an aqueous dispersion of at least one of the copolymers described above. Suitable substrates are in particular paper, cardboard and polymeric film/sheet. The dispersions used for coating may comprise further added or auxiliary substances, for example thickeners to set the rheology, wetting auxiliaries or binders.

To use the coating composition, it is applied to paper, cardboard or a polymeric carrier film/sheet on coating machines for example. When webs are used, the polymer dispersion is typically applied from a trough via an application roll and leveled using an air brush. Other ways to apply the coating include for example the reverse gravure process, spraying processes or a roller blade or other coating processes known to a person skilled in the art. The carrier substrate has been coated on at least one side, i.e., it may have been coated one-sidedly or both-sidedly. Examples of application processes for paper and cardboard are curtain coating, air blade, bar coating or blade coating. Examples of application processes for film/sheet coating are blade, wire-wound bar, airbrush, counterrotating roll application processes, counterrotating gravure coating, casting head or nozzle.

The polymer dispersions obtained in the presence of carbohydrate compounds have improved shear stability and so are particularly useful for application processes where the coating composition is exposed to a high shear load. Preferred application processes are accordingly blade coating and flexographic printing. The invention accordingly also provides a process for producing above-described packaging of the present invention wherein the aqueous polymer dispersion is applied to the packaging substrate by flexographic printing.

The amounts applied to the sheetlike materials are preferably in the range from 1 to 10 g (of polymer solids) per m$^2$, preferably from 2 to 7 g/m$^2$ in the case of polymeric film/sheet or preferably from 5 to 30 g/m$^2$, preferably 5 to 15 g/m$^2$ in the case of paper or cardboard. After the coating compositions have been applied to the carrier substrates, the solvent/water is evaporated. For this, in the case of a continuous process, the material may be led through a dryer duct, which may be equipped with an infrared irradiating device, for example. Thereafter, the coated and dried material is led over a chill roll and finally wound up. The thickness of the dried coating is preferably at least 1 µm, more particularly in the range from 1 to 50 µm and more preferably in the range from 2 to 30 µm or from 5 to 30 µm.

The barrier layer may be situated on at least one of the surfaces of the packaging. It may also form at least one of multiple layers of a multilayered packaging coating, or it may be situated as a coating on at least one side of an inner bag within the packaging. The barrier coating may be applied directly to a surface of the carrier material; however, still other layers may be situated between the carrier and the barrier coating, for example primer layers, further barrier layers or colored or black and white printing ink layers. The barrier layer is preferably situated on the inner side of the packaging, the side which faces the packaged contents.

The inner bag is preferably made of a polymeric film/sheet. The material of the inner bag is preferably selected from polyolefins, preferably polyethylene or oriented polypropylene, while the polyethylene may have been produced not only by the high pressure polymerization process but also by the low pressure polymerization process of ethylene. To still further improve adherence to film/sheet, the carrier film/sheet may first be subjected to a corona treatment. Other suitable carrier films/sheets are for example films/sheets of polyester, such as polyethylene terephthalate, films/sheets of polyamide, polystyrene and polyvinyl chloride. In one embodiment, the carrier material comprises biodegradable films/sheets, for example of biodegradable aliphatic-aromatic copolyesters and/or polylactic acid, for example Ecoflex® or Ecovio® film/sheet. Suitable copolyesters are formed for example of alkanediols, especially C2 to C8 alkanediols such as, for example, 1,4-butanediol, of aliphatic dicarboxylic acids, especially C2 to C8 dicarboxylic acids such as, for example, adipic acid or of aromatic dicarboxylic acids such as terephthalic acid for example. The thickness of carrier films/sheets is generally in the range from 10 to 200 µm.

To obtain specific surficial or coating properties for the films/sheets and packaging media, for example good printability, still better barrier or blocking behavior, good water resistance, it may be advantageous for the coated substrates to be overcoated with covering layers that additionally confer these desired properties, or for the barrier coating to be subjected to a corona treatment. The substrates which have been precoated according to the invention exhibit good overcoatability. Overcoating can again be done using one of the processes recited above, or simultaneous multiple coating can be done, for example by using a curtain coater, in a continuous operation without intermediary winding and unwinding of the film/sheet or paper for example. The barrier layer according to the invention is thereby situated in the interior of the system, and the covering layer then determines the surficial properties. The covering layer has good adherence to the barrier layer.

The invention also provides a process for producing packaging, which process comprises a composition in the form of an above-described aqueous polymer dispersion being provided and applied to a packaging substrate or to the surface of an inner bag and dried, wherein the aqueous polymer dispersion comprises at least one of the above-described copolymers.

The invention also provides for the use of an aqueous polymer dispersion comprising at least one of the above-described copolymers for producing an aroma barrier layer or a barrier layer against volatile, hydrophobic organic compounds, preferably a barrier layer against volatile mineral oil constituents, more particularly for producing packaging, more particularly food packaging.

The substrates coated according to the invention exhibit an outstanding barrier performance against volatile, hydrophobic organic compounds, more particularly against volatile mineral oil constituents. The coated substrates as such can be used as packaging media. The coatings have very good mechanical properties and exhibit good blocking behavior for example. The polymer dispersions used for the coating exhibit high shear stability.

EXAMPLES

Unless the context suggests otherwise, percentages are by weight. A reported content relates to the content in aqueous solution or dispersion.

The following input materials were used:
MMA methyl methacrylate
MA methyl acrylate
AS acrylic acid
S styrene
nBA n-butyl acrylate
AN acrylonitrile
C Dry MD 01915: maltodextrin (Cargill)
C Sweet 01403: glucose syrup (Cargill)
C Plus 10998: maltodextrin, liquid (Cargill)
Acronal® S 505 binder for paper and paperboard coating, styrene/acrylate/acrylonitrile copolymer, about 50% strength
Finntalc talc powder, platelet-shaped pigment
HG90 Hydragloss® 90 calcium carbonate pigment Examples 1-3

Preparation of Polymer Dispersions (Comparative Dispersions)

Purge a reactor with nitrogen and add 450.0 g of demineralized water and 3.0 g of emulsifier (Disponil® LDBS 20, 20% in water) as initial charge. The mixture in the initial charge is heated to 70-90° C. Then, 21.43 g of sodium peroxodisulfate (7% strength) are added before stirring for 50 minutes. Meter the emulsion feed consisting of 240.0 g of water, 26.67 g of emulsifier (Dowfax 2A1, 45% in water) and 600.0 g of monomer mixture as per table 1 into the reactor over 2 hours. After the emulsion feed has ended allow the system to polymerize for 45 min. The reactor is then cooled down to room temperature. Solids content: about 45%

Examples 4-7

Preparation of Carbohydrate-Stabilized Polymer Dispersions

Purge a reactor with nitrogen and add 427.1 g of demineralized water and C Dry MD 01915 (94.7% strength) in the amounts of table 1. The mixture in the initial charge is heated to 86° C. Then, 3.2 g of sodium peroxodisulfate (7% strength) are added before stirring for 5 minutes. Meter the emulsion feed consisting of 180.0 g of water, 20.0 g of emulsifier (Dowfax® 2A1, 45% strength) and 450.0 g of monomer mixture as per table 1 into the reactor over 2 hours. Concurrently with the emulsion feed the initiator feed is started (12.9 g of sodium peroxodisulfate, 7% strength) and likewise metered in over 2 hours. After the emulsion feed has ended allow the system to polymerize for 45 min. The reactor is then cooled down to room temperature. Solids content: as per table 1.

Example 8

Preparation of Polymer Dispersions Stabilized with Glucose Syrup

Purge a reactor with nitrogen and add 351.8 g of demineralized water and 312.5 g of C Sweet 01403 glucose syrup (72% strength). The mixture in the initial charge is heated to 86° C. Then, 3.2 g of sodium peroxodisulfate (7% strength) are added before stirring for 5 minutes. Meter the emulsion feed consisting of 180.0 g of water, 20.0 g of emulsifier (Dowfax 2A1, 45% strength) and 450.0 g of monomer mixture as per table 1 into the reactor over 2 hours. Concurrently with the emulsion feed the initiator feed is started (12.9 g of sodium peroxodisulfate, 7% strength) and likewise metered in over 2 hours. After the emulsion feed has ended allow the system to polymerize for 45 min. The reactor is then cooled down to room temperature. Solids content: as per table 1.

TABLE 1

Copolymer compositions, quantities in wt %

| Examples | Monomers | Degraded starch [pphm] [1] | Tg | Solids content (%) |
|---|---|---|---|---|
| 1 | 55 MA/44 MMA/1 AS | — | ca 50° C. | 45 |
| 2 | 14 S/69 nBA/14 AN/3 AS | — | ca 5° C. | 45 |
| 3 | 55 EA, 44 MMA, 1 AS | — | 30° C. | 45 |
| 4 | 55 EA, 44 MMA, 1 AS | 30 | 30° C. | 47 |
| 5 | 55 EA, 44 MMA, 1 AS | 50 | 30° C. | 50 |
| 6 | 55 EA, 44 MMA, 1 AS | 75 | 30° C. | 54 |
| 7 | 55 EA, 44 MMA, 1 AS | 100 | 30° C. | 57 |
| 8 | 55 EA, 44 MMA, 1 AS | 50 | 30° C. | 50 |

[1] weight parts per hundred weight parts of monomers

Examples 9-14

Preparation of Carbohydrate-Stabilized Polymer Dispersions

Purge a reactor with nitrogen and add demineralized water and C Plus 10998 maltodextrin (94.7% strength) in the amounts of table 2. The mixture in the initial charge is heated to 86° C. Then, 3.2 g of sodium peroxodisulfate (7% strength) are added before stirring for 5 minutes. Meter the emulsion feed consisting of 180.0 g of water, 20.0 g of emulsifier (Dowfax 2A1, 45% strength) and 450.0 g of monomer mixture (4.5 g of acrylic acid, 198.0 g of methyl methacrylate and 247.5 g of ethyl acrylate) into the reactor over 2 hours. Concurrently with the emulsion feed the initiator feed is started (12.9 g of sodium peroxodisulfate, 7% strength) and likewise metered in over 2 hours. After the emulsion feed has ended allow the system to polymerize for 45 min. The reactor is then cooled down to room temperature.

TABLE 2

Copolymer compositions/starch, quantities in wt %

| Example | Degraded starch [pphm] [1] | Water quantity in initial charge [g] | Solids content (%) |
|---|---|---|---|
| 9 | 30 | 180 | 50 |
| 10 | 50 | 180 | 50 |
| 11 | 75 | 180 | 51 |
| 12 | 100 | 180 | 51 |
| 13 | 150 | 158 | 51 |
| 14 | 200 | 135 | 51 |

[1] weight parts per hundred weight parts of monomers

Example 15

Comparator

Like Example 3 except that C Plus 10998 maltodextrin (30 pphm) is admixed after the polymerization.

Example 16

Comparator

C Plus 10998 liquid maltodextrin

Coated papers were produced by a manual coater or a lab coater being used to apply a test composition to calendered standard paper at 25-28 g/m² coat weight as sum of two coats and drying.

Barrier Test Against Gaseous Mineral Oil Constituents 9 ml of hexane are poured into a vessel containing a sponge and closed with a lid which has an opening and a sealing ring (internal diameter 63 mm). The opening is tightly closed with the barrier material to be tested, while the barrier material does not come into contact with the hexane-drenched sponge. The weight decrease of the vessel is measured. The weight decrease is a measure of the hexane exiting through the barrier material via the gas phase, and thus is a measure of the barrier performance against gaseous mineral oil constituents. The weight decrease in grams is converted to 1 m² of paper area and then reported as g/m² d.

Test for Shear Stability 100 g of test composition in a 1 liter square bottle are stirred with a Pentraulik stirrer having a jagged stirring disk at a speed of 8000 rpm for 5 minutes. After shearing, the test composition is filtered through a 125µ sieve, dried at 70° C. for 2 hours and the filter residue is arithmetically projected on 1 kg of test composition and assessed as a measure of shear stability. The less filter residue is obtained, the less coagulum has formed in the course of shearing and the greater the shear stability is.

Pore Test

A test oil with blue dye (terpentine oil or oleic acid with 2% Sudan Blue) is rubbed with a ball of absorbent cotton over a substrate surface coated with a test composition and immediately removed again with a clean area of the ball of absorbent cotton. Pores and uncoated places discolor at once, the oil on the intact coating is removable without causing any coloration. The test area is assessed by visual inspection. The less the discoloration, the greater the absence of pores in the coated surface.

The test results are summarized in tables 3 and 4.

TABLE 3

Test results of Examples 1-7

| Example | Degraded starch [pphm] [1] | Shear stability in % coagulum | Hexane permeation [g/m² d] | Pore test |
|---|---|---|---|---|
| 1 | — | slightly unstable Ca. 0.3% | 200-220 | poor, many pores |
| 2 | — | stable <0.01% | 260-290 | very good, no pores |
| 3 | — | unstable Ca. 3.6% | 1-5 | good Few pores |
| 4 | 30 | stable <0.01% | 1-5 | very good, no pores |
| 5 | 50 | stable <0.01% | 1-5 | very good, no pores |
| 6 | 75 | stable <0.01% | 1-5 | very good, no pores |
| 7 | 100 | stable <0.01% | 1-5 | very good, no pores |

[1] weight parts per hundred weight parts of monomers

The results show that Examples 4 to 7 according to the invention evince the best combination of advantageous properties in respect of shear stability, hexane permeation and pore formation.

TABLE 4

Test results of Examples 9-16

| Example | Degraded starch [pphm] [1] | Polymer dispersion shear stable | Hexane permeation [g/m² d] | Film property |
|---|---|---|---|---|
| 3 | 0 | no | 1-5 | good (blocking) |
| 9 | 30 | yes | 1-5 | good (little blocking) |
| 10 | 50 | yes | 1-5 | good (little blocking) |
| 11 | 75 | yes | 1-5 | good (little blocking) |
| 12 | 100 | yes | 25 | good (little blocking) |
| 13 | 150 | yes | 45 | good (little blocking) |
| 14 | 200 | yes | 45-50 | poor, brittle |
| 15 | 30 (as blend) | no | 1-5 | good |
| 16 | n.a. | n.a. | 1500 | — |

[1] weight parts per hundred weight parts of monomers

The results show that the optimum amount of carbohydrate is in the range from 30 to 150 pphm and that shear stability benefits when the carbohydrates are already present during the polymerization.

Examples 17-21

Pigmented Paper Coating Slips

Paper coating slips having the compositions as per table 5 were produced. The coating slips were adjusted with a thickener (Sterocoll® HT) to viscosities of about 1500-2000 mPas (Brookfield 100/min) and with NaOH to a pH of about 8.2 to 8.3. The results of barrier tests are summarized in table 5.

TABLE 5

Compositions of Examples 17-21, quantities in parts by weight based on solids content

| Example | Polymer dispersion of Example 4 | Acronal ® S 505 | Pigment | Hexane permeation [g/m² d] |
|---|---|---|---|---|
| 17 | 100 | — | — | 4 |
| 18 | 80 | — | 20 Finntalc | 6 |
| 19 (comparator) | — | 50 | 50 HG90 | 700 |
| 20 | 37.5 | 12.5 | 50 HG90 | 70 |
| 21 | 50 | — | 50 HG90 | 40 |

We claim:

1. A paper or a cardboard packaging produced at least partly from mineral oil contaminated paper, wherein the packaging includes at least one barrier layer obtained by applying an aqueous polymer dispersion comprising at least one copolymer obtained by emulsion polymerization of
   (a) one or more principal monomers that are $C_1$-$C_4$ alkyl (meth)acrylates,
   (b) 0.1 to 5 wt % of one or more acid monomers,
   (c) 0-20 wt % of acrylonitrile and
   (d) 0 to 10 wt % of a further monomer other than the monomers (a) to (c),
   wherein a glass transition temperature of the copolymer is in the range from +10 to +45° C.,
   wherein the emulsion polymerization is carried out in an aqueous medium comprising a carbohydrate compound,
   wherein the barrier layer comprises the carbohydrate compound, and
   wherein the barrier layer may be situated on one or more of the surfaces of the packaging; or the barrier layer may form at least one of multiple layers of a multilayered packaging coating.

2. The packaging of claim 1 wherein the copolymer comprises, in reacted form, at least 70 wt % of the one or more principal monomers (a).

3. The packaging of claim 1 wherein the carbohydrate compound is a degraded polysaccharide.

4. The packaging of claim 1 wherein the carbohydrate compound comprises degraded polysaccharides having an intrinsic viscosity $\eta_i$ of less than 0.07 dl/g.

5. The packaging of claim 1 wherein the emulsion polymerization is carried out in an aqueous medium comprising 10 to 200 parts by weight of the carbohydrate compound per 100 parts by weight of monomer.

6. The packaging of claim 1 wherein the one or more principal monomers (a) are selected from the group consisting of methyl acrylate, methyl methacrylate, ethyl acrylate and n-butyl acrylate.

7. The packaging of claim 1 wherein the copolymer is obtained by emulsion polymerization of
   (a) 79.5 to 99.5 wt % of one or more principal monomers that are $C_1$-$C_4$ alkyl (meth)acrylates,
   (b) 0.5 to 5 wt % of one or more acid monomers selected from acrylic acid and methacrylic acid,
   (c) 0-20 wt % of acrylonitrile, and
   no further monomers other than the monomers (a) to (c).

8. The packaging of claim 1 wherein the glass transition temperature of the copolymer is in the range from +15 to +40° C.

9. The packaging of claim 1 wherein the monomer (d) is at least one selected from the group consisting of a $C_5$-$C_{20}$ alkyl (meth)acrylate, a vinyl ester of carboxylic acid comprising up to 20 carbon atoms, a vinylaromatic having up to 20 carbon atoms, an ethylenically unsaturated nitrile other than acrylonitrile, a vinyl halide, a vinyl ester of alcohol comprising 1 to 10 carbon atoms, an aliphatic hydrocarbon having 2 to 8 carbon atoms and one double bond and an aliphatic hydrocarbon having 2 to 8 carbon atoms and two double bonds.

10. The packaging of claim 1 wherein the copolymer is present in combination with up to 1 part by weight of a pigment, per 1 part by weight of copolymer.

11. The packaging of claim 1 wherein the copolymer is comprised in the aqueous polymeric dispersion in an amount of 15 to 75 wt %.

12. The packaging of claim 1 wherein the coating with the copolymer has a permeability to gaseous n-hexane of less than 50 g/m² d at 23° C. and a coat weight of 5 to 30 g/m² on paper.

13. The packaging of claim 1 wherein the mineral oil contamination comprises a volatile paraffin, a volatile naphthene and/or a volatile aromatic hydrocarbon.

14. The packaging of claim 1 wherein the barrier layer is from 2 to 30 μm in thickness.

15. A process for producing the packaging of claim 1, the process comprising:
    applying the aqueous polymeric dispersion to a packaging substrate or to a surface of an inner bag; and
    drying the aqueous polymeric dispersion.

16. The process of claim 15 wherein the aqueous polymeric dispersion is applied to the packaging substrate by a printing process.

17. The process of claim 15 wherein the barrier layer is a barrier against volatile, hydrophobic organic compounds.

18. The process of claim 17 wherein the volatile, hydrophobic organic compounds have a solubility of less than 1 wt % in water at 20° C. and a molecular weight of less than 500.

19. The process of claim 17 wherein the barrier layer is an aroma barrier layer or a barrier layer against volatile mineral oil constituents.

* * * * *